(12) United States Patent
Aicher et al.

(10) Patent No.: US 11,781,747 B2
(45) Date of Patent: Oct. 10, 2023

(54) METHOD AND APPARATUS FOR SETTING THE IGNITION PROPERTY OF A FUEL

(71) Applicant: Fraunhofer-Gesellschaft zur Förderung der angewandten Forschung e.V., Munich (DE)

(72) Inventors: Thomas Aicher, Freiburg (DE); Robert Szolak, Freiburg (DE); Alexander Susdorf, Breisach (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 180 days.

(21) Appl. No.: 15/983,401

(22) Filed: May 18, 2018

(65) Prior Publication Data

US 2018/0266676 A1     Sep. 20, 2018

Related U.S. Application Data

(63) Continuation of application No. PCT/EP2016/078213, filed on Nov. 19, 2016.

(30) Foreign Application Priority Data

Nov. 19, 2015   (DE) .................... 10 2015 120 106.2

(51) Int. Cl.
*F23C 13/02* (2006.01)
*F02D 41/30* (2006.01)
(Continued)

(52) U.S. Cl.
CPC ................ *F23C 13/02* (2013.01); *F02B 1/12* (2013.01); *F02D 41/0025* (2013.01);
(Continued)

(58) Field of Classification Search
CPC ............ F23C 13/02; F02M 27/02; F23R 3/40
(Continued)

(56) References Cited

U.S. PATENT DOCUMENTS 3,828,736 A *  8/1974 Koch .................... F02M 27/02
                                                      123/3
4,112,876 A   9/1978 Mentschel
(Continued)

FOREIGN PATENT DOCUMENTS

DE    102006060669 A1 *   6/2007   ............ F23D 5/126
DE    102006060669 A1    9/2010
(Continued)

OTHER PUBLICATIONS

Translation of DE102006060669a1.*
(Continued)

*Primary Examiner* — Steven B McAllister
*Assistant Examiner* — John E Bargero
(74) *Attorney, Agent, or Firm* — Crowell & Moring LLP

(57) ABSTRACT

The ignition characteristics of a fuel are adjusted using a unit which has a distribution zone, a oxidation zone and a conversion zone. Fuel is distributed in the distribution zone having a distribution structure. A portion of the fuel is oxidised in the oxidation zone with a oxidising agent on a catalyst on a catalyst carrier, and a portion of the distributed fuel and/or of another supplied fuel is thermally and/or catalytically converted in the conversion zone. The ignition characteristics of the fuel are adjusted via: the molar ratio of oxygen included in the oxidising agent to the oxygen required for the complete oxidation of the fuel provided; and/or via the pressure in the unit; and/or the dwell time; and/or the temperature. Exhaust emissions, in particular NOx and soot emissions, can be lowered.

20 Claims, 6 Drawing Sheets

(51) Int. Cl.
*F02M 27/02* (2006.01)
*F02M 31/18* (2006.01)
*F02D 41/00* (2006.01)
*F23C 13/00* (2006.01)
*F02B 1/12* (2006.01)
*F23D 3/40* (2006.01)
*F23C 13/06* (2006.01)
*F23R 3/40* (2006.01)

(52) U.S. Cl.
CPC ......... *F02D 41/3035* (2013.01); *F02M 27/02* (2013.01); *F02M 31/18* (2013.01); *F02M 31/186* (2013.01); *F23C 13/00* (2013.01); *F23C 13/06* (2013.01); *F23D 3/40* (2013.01); *F23R 3/40* (2013.01); *F23C 2900/03002* (2013.01); *F23C 2900/13001* (2013.01); *F23C 2900/99009* (2013.01); *F23D 2900/05002* (2013.01); *Y02E 50/30* (2013.01); *Y02T 10/12* (2013.01)

(58) Field of Classification Search
USPC ..................... 431/7, 159, 163, 170
See application file for complete search history.

(56) References Cited

U.S. PATENT DOCUMENTS

| | | | | |
|---|---|---|---|---|
| 6,775,989 B2 * | 8/2004 | Bandaru et al. | ................ | 60/777 |
| 2005/0011486 A1 | 1/2005 | Cueman | | |
| 2006/0150635 A1 * | 7/2006 | Su | ................ | F23L 15/04 |
| | | | | 60/777 |
| 2007/0180819 A1 | 8/2007 | Sellnau et al. | | |
| 2010/0040919 A1 * | 2/2010 | Ravenda | ................ | C01B 3/382 |
| | | | | 429/412 |
| 2015/0075451 A1 * | 3/2015 | Inuzuka | ................ | F02B 43/12 |
| | | | | 123/3 |

FOREIGN PATENT DOCUMENTS

| | | | | |
|---|---|---|---|---|
| DE | 102010012945 A1 | | 9/2011 | |
| DE | 102015220408 A1 * | | 4/2017 | ............. F23C 13/02 |

OTHER PUBLICATIONS

Abstract for DE-102015220408-A1 attached to end of reference document.*
English translation of International Search Report, issued in International Application No. PCT/EP2016/078213, dated Feb. 24, 2017, pp. 1-3, European Patent Office, Rijswijk, The Netherlands.
Garbe, Thomas, Dissertation in German with English Abstract, titled "Senkung der Emissionen eines PKW mit direkteinspritzendem Dieselmotor durch Verwendung von Kraftstoffen mit abgestummtem Siede—und Zündverhalten" ("Lowering the emissions of a car with a direct injection diesel engine by using fuels with coordinated boiling and ignition behavior"), cited in European Oral Proceedings, University of Hanover, Hanover, Germany, dated 2002, 141 pgs.

* cited by examiner

METHOD AND APPARATUS FOR SETTING THE IGNITION PROPERTY OF A FUEL

CROSS-REFERENCE TO RELATED APPLICATIONS

This application is a continuation of PCT/EP2016/078213 filed Nov. 19, 2016, which claims priority under 35 USC § 119 to Germany patent application 10 2015 120 106.2 filed Nov. 19, 2015. The entire contents of each of the above-identified applications are hereby incorporated by reference.

BRIEF DESCRIPTION OF THE DRAWINGS

The embodiments may be better understood with reference to the following drawings and description. The components in the figures are not necessarily to scale.

DETAILED DESCRIPTION

Figure 1:
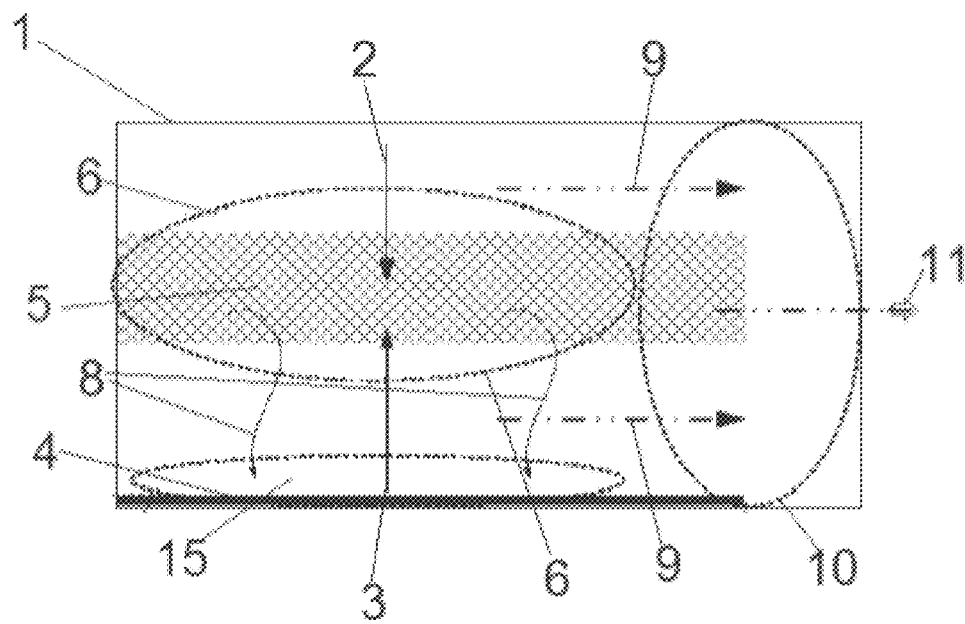
FIG. 1 schematically shows a process for setting the ignition property of a liquid or gaseous fuel.

The present invention relates to a process and an apparatus for setting the ignition property of a liquid or gaseous fuel by means of thermal, catalytic and oxidation reactions. After commencement, no external introduction of energy from the outside is necessary. The heat for the thermal and/or catalytic reactions is provided by an oxidation of an introduced oxidant with part of the introduced fuel over a catalyst. The process and the apparatus comprise a dispersion zone including a dispersion structure on which liquid fuels can be vaporized. The oxidation reactions likewise provide the heat for vaporization of liquid fuels. Furthermore, the heat is utilized for catalytically and/or thermally converting the fuel. In this way, the fuel property can be matched in a targeted manner to various applications. The process described here and the apparatus described can produce a fuel having a high octane number, and correspondingly longer ignition delay times and higher ignition temperatures, from a fuel having a high cetane number, corresponding to short ignition delay times and low ignition temperatures. The fuel can be adjusted so that pollutants such as particulates and nitrogen oxides in a combustion unit, for example an internal combustion engine, a gas turbine or a gas burner, can be reduced. In addition, the efficiency can be increased. Liquid fuels can for the first time also be vaporized and converted in such a way that they are used in gas burners, gas engines and gas turbines without modifications. The fuel can be matched to the respective application by means of the present invention.

The internal combustion engine will be the dominant power source for at least a relatively long time. The automobile industry is faced with an enormous task in order to ensure resource-conserving, sustainable mobility. The great challenge here is to reduce the greenhouse gases and emissions such as nitrogen oxides and particulates. The amounts of carbon particles and $NO_x$ emissions at present have to be reduced by complicated exhaust gas treatment systems such as particulate filters, SCR technology (selective catalytic reduction) and/or $NO_x$ storage catalysts in combination with internal engine measures (cooled exhaust gas recirculation and charging air). Exhaust gas treatment systems are expensive because of their high noble metal loadings of the catalysts and great complexity, increase the weight and the fuel consumption.

Numerous companies and research institutes are at present examining alternative combustion processes in order to decrease the pollutants without or with a reducing exhaust gas treatment. The greatest potential is ascribed to the homogeneous combustion process (S. Raming: "Energiemanagement in Kraftfahrzeugen", papers from the Jülich Research Center, energy technology series, volume 56, 2006, page 108).

The homogeneous combustion process enables the nitrogen oxide and particulates emissions to be reduced by internal engine measures and the thermal efficiency to be increased further at the same time. The challenge of the homogeneous combustion process is the mixture formation, the control of the ignition delay time and ignition temperature and also use at full load and at operating points close to full load in the engine characteristics. The homogeneous combustion process has hitherto been operated using a fuel only in the lower power range of the engine characteristics. In order to widen the power range, the fuel property has to be adapted dynamically (X. Lu et al. Fuel design and management for the control of advanced compression-ignition combustion modes. Progress in Energy and Combustion Science 37 (2011) 741-783).

For many applications in the prior art, it is necessary to vaporize oxidable liquid substances such as gasoline, diesel, bio oils, monohydric and polyhydric alcohols, aldehydes, ethers, carboxylic acids, aromatics and amines. In addition, it is of interest for some applications not only to vaporize the substance but at the same time break up the molecules of the starting substance into energy-rich smaller molecules such as hydrogen, carbon monoxide or organic molecules having C—C double bonds. This makes it possible to match the properties of the starting substance in a targeted way to the application. Possible applications may be found, for example, in combustion in engines or burners, in reforming, in the buildup of chemical compounds by means of chemical syntheses, in refinery processes or in the petrochemical industry.

A plurality of "unit operations" have hitherto had to be connected in series, one for the vaporization of the substance and one for the thermal dissociation of the substance, for such applications.

According to the prior art, the first step, the vaporization, is carried out using apparatuses which are based on the principle of introduction of energy in the form of electric current, microwaves or heat from the outside by means of indirect heat transfer. However, all these methods suffer from heat transfer resistances and heat losses.

If heating is carried out using electric current or using microwaves, provision of these energy forms involves a large outlay from an exergetic point of view. Waste heat from a process cannot be utilized directly in these cases. In the case of introduction of energy by means of electric current or microwaves, energy sources for electric current or microwaves are necessary, which quickly leads to limitations in terms of the available quantity of energy, e.g. on board vehicles.

In the case of introduction of energy in the form of process heat or waste heat, which is very widespread in process engineering, large heat transfer areas are necessary in order to achieve technically and economically feasible heat flows (see, for example, shell-and-tube or plate heat exchangers).

Although some heat exchangers and evaporators having direct heat transfer have been described in the prior art, the energy is usually provided in these cases merely by a hot, gaseous medium which flows through the apparatus.

The second process step, the thermal dissociation of the molecules, is widespread in the chemical and especially the petrochemical industry. Nevertheless, thermal cracking, also referred to as pyrolysis, also plays a role in processes for utilization of waste.

There is a large amount of prior art known in respect of the thermal cracking of petroleum fractions and for the pyrolysis of waste (household waste, plastic fractions, etc). Once again, the energy required for the endothermic thermal cracking is in most cases supplied from the outside, i.e. from an external heat source.

One process concept in which part of the energy required for cracking comes from the material to be cracked itself is, for example, the "cold flame" principle. It has been comprehensively described by Naidja et al. (A. Naidja, C. R. Krishna, T. Butcher, D. Mahjan, Progr. Ener. Combust. Sci. 29, 2003, 155-191). The "cold flame" principle utilizes the effect that a substoichiometric mixture of air and fuel reacts chemically and in the process emits pale bluish light, known as the "cold flame". The energy liberated in the particle oxidation of the fuel breaks up the molecules of the fuel, but these quickly recombine and form stable organic compounds such as alcohols, peroxides, aldehydes and carbon monoxide.

In this context, EP 1 533 494 A2 and U.S. Pat. No. 6,872,482 E2, for example, are concerned with the use of the "cold flame" principle in combustion processes in engines or in the reforming of fossil fuels for production of hydrogen for fuel cell systems.

However, the "cold flame" principle in which no catalyst is used has the disadvantage that a particular temperature of about 500° C. may not be exceeded since main heat liberation can otherwise occur. The air has to be circulated in the reactor. In addition, the cold flame has a strong pressure influence, which greatly narrows the temperature range. Furthermore, quick start times can only be achieved with a high starting energy since the air stream has to be heated to from about 300 to 450° C.

DE 10 2006 060 669 A1 discloses a process which describes the catalytic vaporization and gasification of liquid fuels in the use for heating oil boilers and the reforming of liquid fuels to be employed in fuel cells.

DE 10 2010 012 945 A1 discloses an apparatus for vaporizing liquid fuels. The apparatus has a catalyst system which is concentrated around an air inlet. The catalyst system is surrounded concentrically by a porous material which can absorb the fuel. The porous material is separated from the catalyst system by a space located in between. It is desired only for vaporization of the fuel as a result of substoichiometric, catalytic oxidation. In this way of carrying out the reaction, short-chain hydrocarbons are obtained only as undesirable by-products, in a concentration which is negligible in process engineering terms (<0.5% by volume).

According to the prior art, it is not possible to set the ignition property of oxidizable liquid substances such as gasoline, diesel, bio oils, monohydric and polyhydric alcohols, aldehydes, ethers, carboxylic acids, aromatics and amines in a housing without introduction of energy from the outside.

It is therefore an object of the present invention to provide a process and an apparatus for setting the ignition property of fuels, which overcomes the disadvantages of the prior art.

According to the invention, a process for setting the ignition property of a fuel utilizing a unit which has at least one dispersion zone, at least one oxidation zone and at least one conversion zone is proposed.

Here, fuel is dispersed in the dispersion zone which has a dispersion structure. In the oxidation zone, at least part of the fuel is oxidized by means of at least one oxidant over at least one catalyst on a catalyst support. In the conversion zone, at least part of the dispersed fuel and/or another fuel which has been introduced is thermally and/or catalytically converted.

The process is characterized by the ignition property being set via the molar ratio of oxygen present in the oxidant to the oxygen required for complete oxidation of the fuel present.

As an alternative or in addition, the ignition properties can also be set via the pressure in the unit, and/or the residence time and/or the temperature.

Here, the fact that the possibilities mentioned are frequently not independent of one another does not go unrecognized. Thus, there are certain relationships between, for example, pressure and residence time.

At this point, the term ignition property should be defined. The known variables ignition delay time and ignition temperature should firstly be presented here.

The ignition temperature is the temperature to which a material or a contact surface has to be heated for a combustible substance, whether a solid, a liquid, vapors thereof or gas, to ignite spontaneously in the presence of air exclusively as a result of its temperature, i.e. without an ignition source such as an ignition spark. It has a different level for each material and in many cases is dependent on the pressure.

In the injection of a fuel/air mixture, there is a delay between injection and the commencement of main heat liberation. This time interval characterizes the ignition delay time. The ignition delay time is made up of free-radically induced time intervals and is specific for each fuel and is dependent on pressure and temperature.

The cetane number describes the ignition readiness of a fuel. The higher the cetane number, the more ready the fuel is to ignite. This behavior is desirable in the case of diesel engines, but owing to the molecular composition and the combustion process, causes high emissions of particulates and nitrogen oxides. The octane number is the reciprocal of the cetane number; a high octane number means that the fuel is less ready to ignite. Gasoline, for example, has a high octane number and has to be ignited in the engine by means of an outside ignition source, normally a spark plug. For alternative combustion processes, it is necessary to adapt the ignition readiness dynamically; at low loads, the fuel used has to be rather ready to ignite, while at higher loads, the ignition readiness should be reduced. The cetane number is determined in a standardized method at one pressure and one temperature. The cetane number (or octane number) is therefore not suitable for describing the overall course of combustion. A detailed profile of the ignition delay time as a function of pressure and ignition temperature therefore has to be determined. Only in this way can dynamic combustion processes be described satisfactorily. In the case of the present invention, the ignition delay time and the ignition temperature can be set dynamically between diesel, gasoline and others by means of the process and the apparatus over the entire pressure and temperature range.

The present invention is not limited to the cetane number determined under standard conditions, but instead it is concerned with the ignition delay time and/or ignition temperature at various values of pressure and temperature which normally deviate from the standard conditions. In this regard, reference is generally made to the ignition property of the fuel. The ignition delay time and/or the ignition temperature can then be derived from the ignition property at the respective values of pressure and temperature.

The targeted selection of the molar ratio and/or the other parameters mentioned allows the ignition property to be influenced. The process thus allows targeted influencing of the properties of fuel and thus matching of the fuel to the respective requirements. Particularly in the case of internal combustion engines, the requirements which the fuel has to meet for optimal combustion are dependent on the load. A comparatively simple process for adapting the fuel to the respective requirements therefore brings considerable advantages.

In an important embodiment, vaporization of liquid fuel can occur in the dispersion zone. The dispersion zone can in this respect also be referred to as vaporization zone. The fuel should normally be present at least predominantly in gaseous form in the oxidation zone and in the conversion zone. As indicated below, this can also be effected energetically favorably.

In one embodiment, at least part of the heat evolved by the oxidation is transferred into the dispersion zone and/or into the conversion zone. The heat liberated in the oxidation can be utilized efficiently in this way. It goes without saying that heat is required in the dispersion zone especially when vaporization takes place there.

In one embodiment, the heat is transferred by convection and/or radiation. Heat conduction cannot be ruled out, but generally plays a subordinate role. Normally, oxidation zone, dispersion zone, and conversion zone are in radiative contact, so that certain heat exchange by radiation takes place. However, the fact that heat exchange additionally occurs by convection is critical. It is of course a prerequisite of this that flow occurs from the oxidation zone into the dispersion zone and the conversion zone. Flow from the oxidation zone into the conversion zone is known in the prior art and arises simply from the fact that conversion follows the oxidation and the partially oxidized fuel flows into the conversion zone. Flow from the oxidation zone into the dispersion zone, which in the case of liquid fuels is, as indicated, equivalent to the vaporization zone, is in contrast not known. Normally, however, flow from the dispersion zone into the conversion zone is known. Even though such flow also has to be present, a significant contribution is also made by bringing about a flow from the oxidation zone into the dispersion zone. It is clear here that there have to be different regions between oxidation zone and dispersion zone so that there are regions in which flow occurs from the oxidation zone into the dispersion zone and there are further regions in which flow occurs from the dispersion zone into the oxidation zone.

Under conventional conditions, about half of the heat transfer occurs by convection, while the other half occurs by radiation of heat. Paragraph of DE 10 2006 060 669 A1 also mentions convection of heat from the catalyst through the space filled with fuel vapor and air to the layer comprising fuel. However, on closer examination, in particular of FIG. 1 of DE 10 2006 060 669 A1, it can be seen that this is a minor effect. Accordingly, it is also mentioned at the end of paragraph [0017] of DE 10 2006 060 669 A1 that radiation of heat predominates.

In one embodiment, the oxidant is conveyed onto the dispersion zone in such a way that it is subsequently conveyed together with the fuel into the oxidation zone and/or conversion zone. Here, it has to be ensured that the oxidant can flow as part of a mixture to the dispersion zone. The above-described heat convection is achieved by means of this flow.

In one embodiment, the energy required for vaporization and thermal and/or catalytic conversion is obtained substantially by means of the oxidation. This is not intended to rule out the necessity of additional heating, particularly in the starting phase. As long as no vaporized or unvaporized fuel which can be oxidized is present, no heat which can be utilized for vaporization is available from the oxidation. Disregarding such special situations, it is possible to obtain the energy required for vaporization and for conversion from the oxidation.

In one embodiment, oxidant, fuel and intermediates are mixed in, in particular, the oxidation zone. This occurs especially in connection with the abovementioned flow from the oxidation zone into the conversion zone and vice versa. Particular mixing processes which are not known in the prior art and which contribute to conversion of the fuel and thus to setting of the ignition property result from these flow conditions. The flowing gas mixtures formed here can contribute to heat transfer by convection.

In one embodiment, the oxidant includes oxygen or oxygen-containing media, in particular air or exhaust gases comprising residual oxygen. It is thus not necessary for particularly pure oxygen to be present for the oxidation. Air and in many cases even exhaust gas comprising residual oxygen are sufficient.

In one embodiment, the pressure in the unit is from 0.01 to 100 bar, preferably 0.01-50 bar, particularly preferably from 0.05 to 10 bar. These pressure ranges have been found to be useful. The pressure reported is a gauge pressure relative to the surroundings.

In one embodiment, the fuel is selected from among fuels such as gasoline, diesel, bio oils, pyrolysis oils, biodiesel, heavy oil, alcohols, Fischer-Tropsch fuels, dimethyl ether, diethyl ether, oxymethylene ethers (OME1-OME10 and mixtures), esters, aldehydes, aromatics, amines, carboxylic acids, alkanes—here especially methane, ethane, propane, butane—natural gas, flare gases, landfill gases, bio gases and mixtures thereof. It can be seen from the examples mentioned that the fuels are normally liquid or gaseous fuels. The use of solid fuels should not be ruled out, but would be difficult for reasons of handling.

In one embodiment, the molar ratio of oxygen present in the oxidant to the oxygen required for complete oxidation of the fuel present is from 0.03 to 0.9, preferably from 0.05 to 0.4, particularly preferably from 0.1 to 0.3. Such values have been found to be useful.

In one embodiment, the ignition property is additionally set via at least one of the following parameters:

the distances between oxidant inlet, catalyst and vaporizer structure, position and/or dimension and/or number and/or shape of the oxidant inlet and fuel inlet, flow field of the oxidant, structure and cell density of the catalyst support, the catalyst material and the distribution thereof on the catalyst support, arrangement and shape of the outlet.

It should be pointed out here that a plurality of inlets which can be closed and opened can be present, with partial opening or closing also being possible. The oxidant and fuel inlet can, for example, be round, flat or angular. The process can be influenced in this way.

The flow field of the oxidant describes the direction and speed of oxidant flow at various places. This is ultimately dependent on the geometric conditions, i.e. the structure of the unit, distances of the inlets and the like and also the volume of flow set and the prevailing pressure.

It should be noted that some parameters are dependent on the apparatus utilized and therefore cannot be influenced during operation. These normally include, for example, the structure and cell density of the catalyst support. The situation is different in the case of, for example, inlets, which can be closed and opened during operation.

The arrangement and shape of the outlet is in principle also predetermined by the unit. It would of course also be conceivable here to provide, for example, a tube having various switchable openings projecting into the unit. If, for example, a further inward-projecting opening were to be opened, the conversion zone could at the same time be shortened thereby. This could be desirable in some operating states.

In one embodiment, the converted fuel is fed to a combustion apparatus, preferably an internal combustion engine such as a gasoline engine, a diesel engine or a gas engine, a turbine or a burner.

In one embodiment, the setting of the ignition property is regulated in such a way that, taking into account the variable performance requirements which the combustion apparatus has to meet, a pollutant emission, in particular the emission of NOx and particulates, of the combustion apparatus is reduced. As a result of the regulation with the aim of reducing the pollutant emission, the conversion of the fuel is optimized in this direction. In some cases it will of course not be useful to attempt a maximum pollutant reduction. It can, for example, also be useful to accept a somewhat higher pollutant emission if this allows a significantly lower consumption.

In one embodiment, the converted fuel is fed to an exhaust gas after-treatment apparatus. It is frequently customary to introduce fuel into the exhaust gas at selected time intervals. Injectors which introduce fuel into the exhaust gas between engine and oxidation catalyst are widely utilized for this purpose. This fuel can lead to increased liberation of heat in an oxidation catalyst and heat up the exhaust gas stream. This heated exhaust gas stream can serve to burn off carbon particulates which are present on a particulates filter. The particulates filter is regenerated in this way.

To make this liberation of heat possible, the temperature must not go below a light-off temperature of the oxidation catalyst. The use of the converted fuel instead of conventional fuel enables this light-off temperature to be reduced. It is therefore often unnecessary to heat the oxidation catalyst. This has hitherto often been necessary because the exhaust gas temperature downstream of the engine is increasingly decreased by internal engine measures such as exhaust gas recirculation and high charging.

Efficient exhaust gas treatment is therefore not always possible in the prior art. A sufficient increase in the exhaust gas temperature can be brought about more easily by means of the converted fuel. A significant decrease in the pollutant emission can be achieved in this way. This is particularly the case at low operating temperature and/or low load. This often occurs in motor vehicles in city driving, in the case of which the pollutants are particularly harmful to human beings.

The converted fuel can also serve to reduce nitrogen oxides in storage catalysts in a wide temperature window. In this way, nitrogen oxides are reliably reduced even at low exhaust gas temperatures.

The invention also provides an apparatus for setting the ignition property of at least one fuel, comprising at least one fuel inlet and at least one oxidant inlet.

Furthermore at least one dispersion zone for dispersing the fuel by means of a dispersion structure for the fuel, at least one oxidation zone for the at least partial oxidation of the fuel, comprising at least one catalyst support with at least one catalyst, at least one conversion zone for the at least partial catalytic and/or thermal conversion of the fuel and at least one outlet for fuel having an altered ignition property, is provided.

The oxidant inlet, the catalyst support and the dispersion zone are arranged and configured in such a way that heat evolved in the oxidation zone can be transferred to a gas or gas mixture flowing into the dispersion zone and/or conversion zone.

Even though an embodiment of the process using an apparatus different from that described here may also be possible, the apparatus is particularly suitable for carrying out the above-described process. To avoid repetition, reference is therefore made to the description of the process in order to supplement the considerations below.

Firstly, it should be clearly stated that the apparatus is, like the process, suitable not only for a pure fuel in each case. It is quite possible to process various fuels or fuel mixtures.

It is particularly important that the arrangement and configuration of oxidant inlet, catalyst support and dispersion zone be such that heat involved in the oxidation zone can be transferred to a gas or gas mixture flowing into the dispersion zone and/or conversion zone. Targeted heat transport from the oxidation zone into the dispersion zone and into the conversion zone can be brought about in this way. Since dispersion, in the case of liquid fuels also vaporization, in the dispersion zone firstly occurs during the process before the oxidation, such a flow does not occur automatically; rather, a deliberate arrangement is necessary. The flowing gas or gas mixture is normally the gas or gas mixture which comes out of the oxidant inlet and flows through the oxidation zone or along the oxidation zone into the dispersion zone. Mixtures, for instance with previously oxidized fuel or with intermediates from the oxidation and the conversion reaction products, are of course also possible.

It is possible here for the apparatus to include precisely one reaction chamber, with the reaction chamber having the at least one dispersion zone, the at least one oxidation zone and the at least one conversion zone. The apparatus is normally accommodated in a housing.

Even when mention is made of an outlet for fuel having an altered ignition property, it has to be made clear that other gases, for instance unconverted nitrogen present in introduced air, can also flow through the outlet.

As mentioned above, the dispersion zone is, in one embodiment, configured so that liquid fuel can be vaporized in the dispersion zone.

In one embodiment, the catalyst support is arranged between the dispersion structure for the fuel and the oxidant inlet in such a way that gas or gas mixture flowing out from the oxidant inlet is conveyed to the dispersion zone so that it is subsequently discharged together with the fuel into the oxidation zone and/or conversion zone.

Firstly, it has to be stated that air, i.e. a gas mixture which includes air as oxidant, is generally blown in at the oxidant inlet. In any case, the gas or gas mixture blown in includes oxidant, normally oxygen. However, pure oxygen is normally not blown in, but instead air, as mentioned above.

The above-indicated embodiment is normally realized by air being blown in on a side of the catalyst support facing away from the dispersion zone and flowing through the catalyst support to the dispersion zone. There are of course many further variants. Thus, flow can also occur onto the catalyst support in such a way that the gas or gas mixture comprising oxidant bounces off the catalyst support again and flows into the dispersion zone, with heat being absorbed by the catalyst support and transported into the dispersion zone.

In one embodiment, the catalyst support has recesses and/or flow channels which assist flow of the oxidant through to the dispersion zone. It is of course usually important that heat from the catalyst support can nevertheless be transferred to the flowing oxidant.

In one embodiment, the catalyst support includes an open-pored structure or flow channels. These should likewise assist flow of the oxidant. The catalyst support can for this purpose be, for example, ceramic or metallic. A foam structure or a honeycomb structure are possible. Flow channels can be present with a cell density of at least 50-1000 cells per square inch, preferably 200-600 cells per square inch. The foam structure preferably has a porosity of 20% to 98%, particularly preferably 50%-95%.

In one embodiment, the dispersion structure for the fuel and the catalyst support are constructed in a planar and/or concentric manner, with a modular construction having a multiply repeating arrangement being possible. This can, if required, occur in a stack. This enables a very high thermal input power to be realized in a compact unit. Very high vaporizer performances can likewise be achieved thereby. This cannot be achieved by means of the previous prior art.

In one embodiment, arrangement in a stack is possible. The actual arrangement in a stack is also to be protected. Arrangement in a stack makes a compact configuration possible.

In one embodiment, the dispersion structure for the fuel is formed by a nonwoven arranged on the interior wall of the housing and/or by structuring on the interior wall of the housing. In this way, the flow velocity in the case of liquid fuels can be reduced, so that more time is available for vaporization.

In one embodiment, oxidant inlets are arranged in a plurality of planes and/or at a plurality of places per plane, with the oxidant inlets being able to be configured in the form of holes and/or slits and being positioned so that the oxidant can flow along and/or through the catalyst support. Once again, it should clearly be stated that the oxidant can flow as part of a gas or gas mixture.

Likewise, fuel inlets are, in one embodiment, arranged in a plurality of planes and/or at a plurality of places per plane, with the fuel inlets being able to be configured in the form of holes and/or slits and being positioned so that the fuel can flow into the dispersion zone.

In one embodiment, the apparatus can be operated vertically, horizontally or inclined. There are thus more degrees of freedom for installation of the apparatus. In addition, this allows, as indicated above, use in a motor vehicle.

In one embodiment, an additional heating device, in particular an electric heating device, is present. The use of hot exhaust gas for assisting heating is also conceivable. The additional heating device is employed, in particular, for starting.

In one embodiment, the apparatus is configured so that the fuel exiting from the apparatus can be fed to a combustion apparatus, preferably an internal combustion engine, for example a gasoline engine, a diesel engine or a gas engine, a turbine or a burner. In this way a pollutant reduction in the exhaust gas can be achieved during operation of the combustion apparatus.

In one embodiment, the apparatus is configured for carrying out the above-described process.

Figure 3:
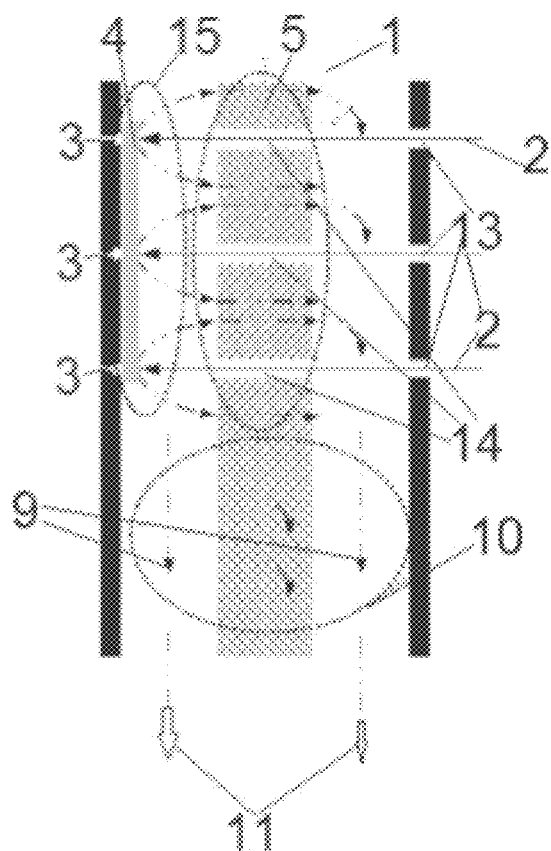
FIG. 3 shows a sectional view of FIG. 2.
Figure 4:
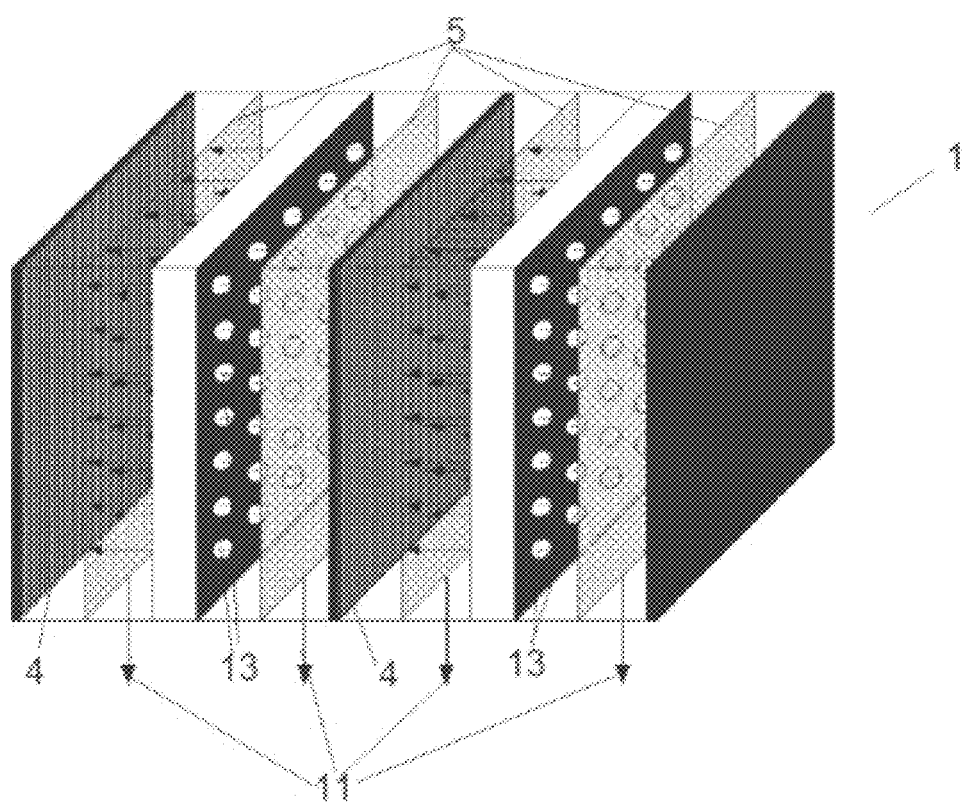
FIG. 4 schematically shows the apparatus with a stack construction.
Figure 5:
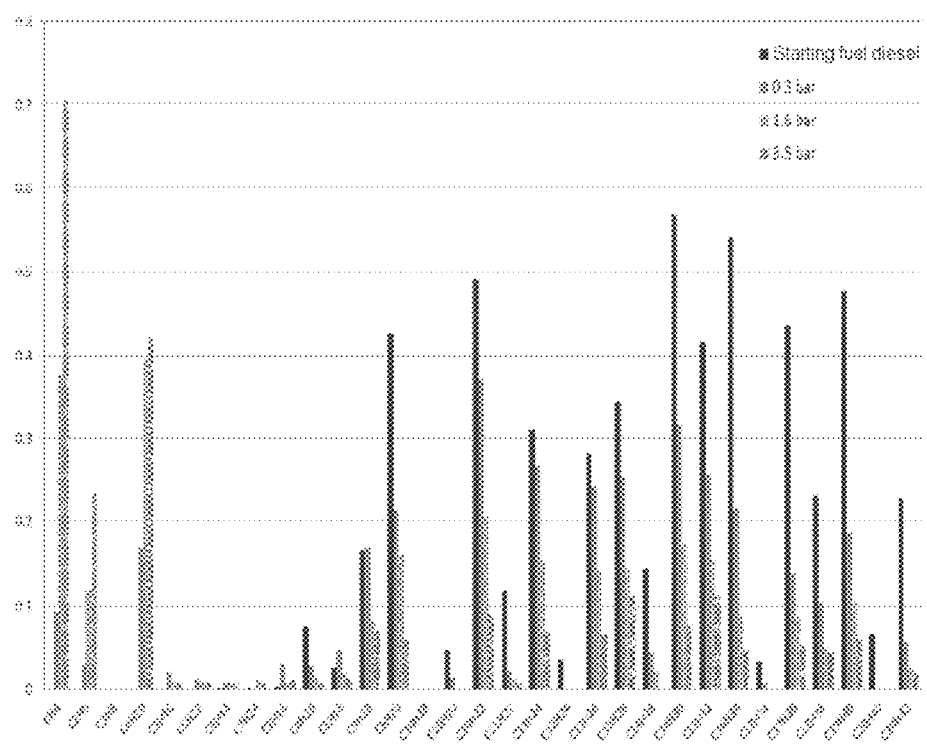
FIG. 5 shows, in graph form, the influence of the pressure on the distribution of the alkanes in the fuel.
Figure 6:
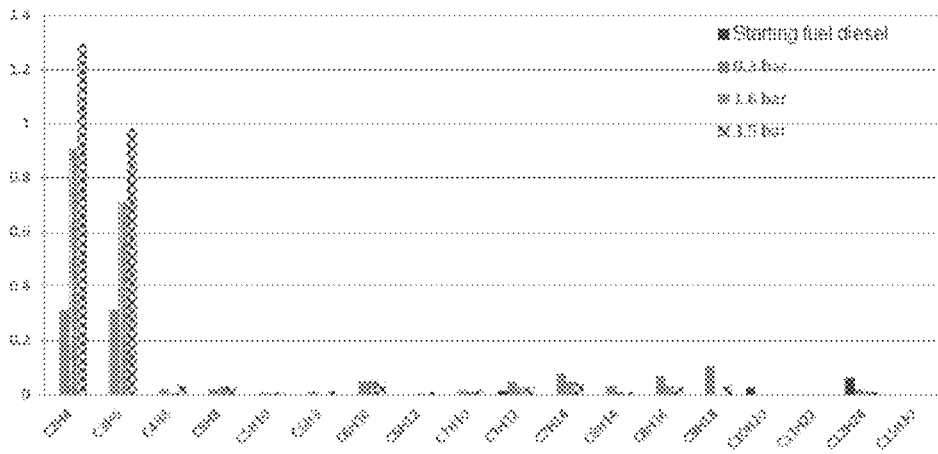
FIG. 6 shows, in graph form, the influence of the pressure on the distribution of the alkenes in the fuel.
Figure 7:
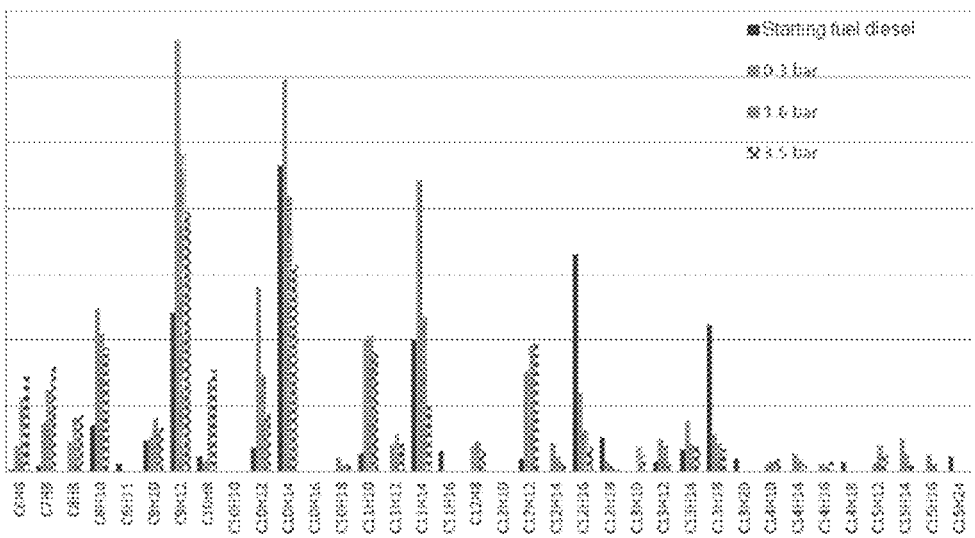
FIG. 7 shows, in graph form, the influence of the pressure on the distribution of the aromatics in the fuel.
Figure 8:
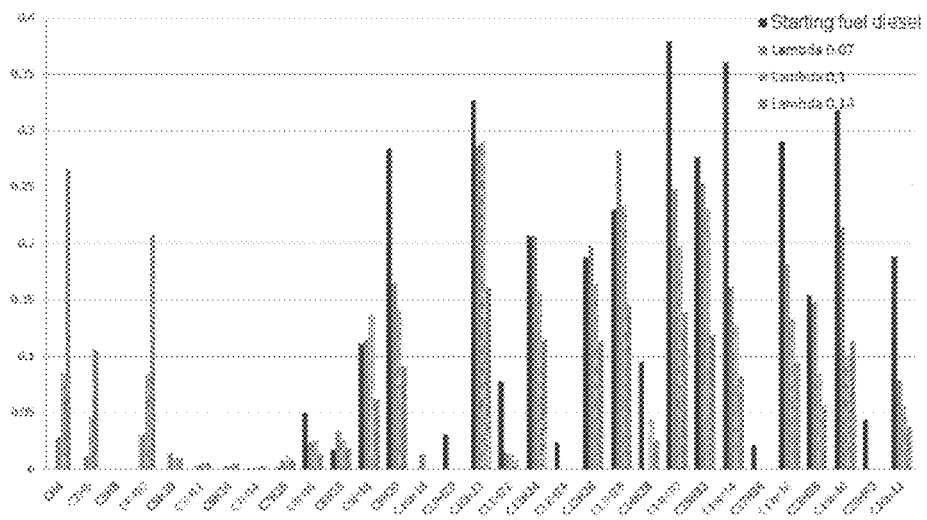
FIG. 8 shows, in graph form, the influence of the air number on the distribution of the alkenes.
Figure 9:
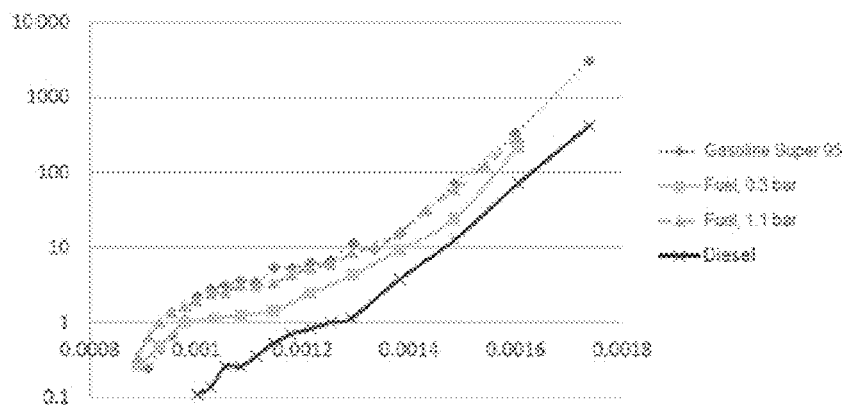
FIG. 9 shows the change in the ignition property of diesel to a fuel having ignition properties similar to super gasoline.

The present invention will be illustrated with the aid of the following figures, without the invention being restricted to the specific embodiments presented here. In the figures, FIG. 1 schematically shows the process of the invention, FIG. 2 shows a three-dimensional depiction of the apparatus of the invention, FIG. 3 shows a sectional view of FIG. 2, FIG. 4 schematically shows the apparatus of the invention with a stack construction, FIG. 5 shows, in graph form, the influence of the pressure on the distribution of the alkanes in the fuel, FIG. 6 shows, in graph form, the influence of the pressure on the distribution of the alkenes in the fuel, FIG. 7 shows, in graph form, the influence of the pressure on the distribution of the aromatics in the fuel, FIG. 8 shows, in graph form, the influence of the air number on the distribution of the alkenes, FIG. 9 shows the change in the ignition property of diesel to a fuel having ignition properties similar to super gasoline.

FIG. 1 schematically shows the process of the invention. A housing 1 is present for this purpose. On one side of the housing 1, air 2 comprising the oxygen serving as oxidant is blown in. Fuel 3 is introduced on the other side. The fuel 3 goes into a dispersion zone 15 in which a nonwoven 4 serving as dispersion structure is located. The fuel 3 vaporizes in the nonwoven 4 and flows to the catalyst support 5 which is present in the oxidation zone 6 in which oxidation takes place. Noble metal-containing catalyst material is present on the catalyst support 5, e.g. platinum on a gamma-aluminum oxide. At the same time, the air 2 flows through the catalyst support 5 and transfers heat, which serves to vaporize the fuel 3, by convection to the nonwoven 4. Heat transport additionally occurs by radiation of heat and is indicated by the arrows 8. Between catalyst support 5 and nonwoven 4, there is thus flow from the catalyst support 5 to the nonwoven 4 and also from the nonwoven 4 to the catalyst support 5. Details of this will be explained again later. In addition, there is flow, indicated by the arrows 9, in the direction of a conversion zone 10. Thermal and catalytic conversion of the vaporized fuel 3 takes place in the conversion zone 10. Finally, converted fuel 11, i.e. fuel having altered ignition properties, leaves the housing 1.

Figure 2:
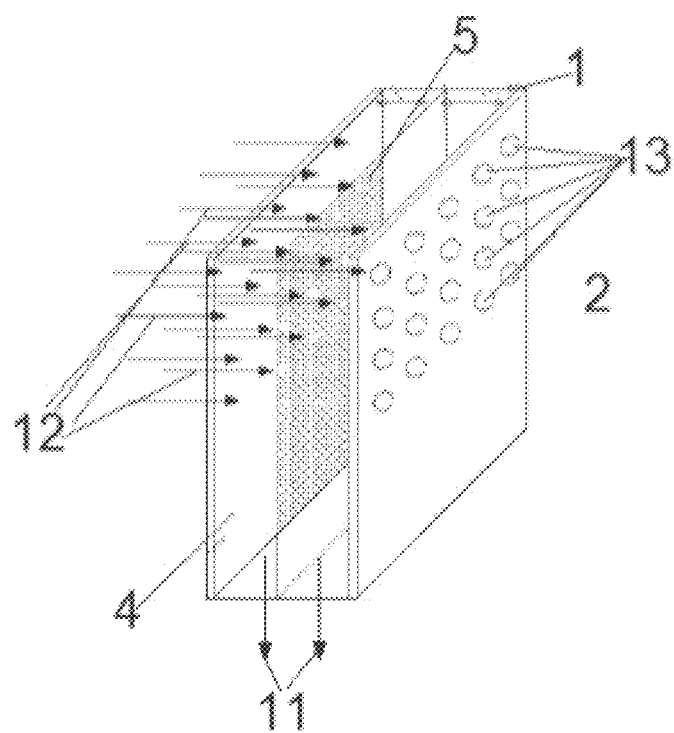
FIG. 2 shows a three-dimensional depiction of an apparatus for setting the ignition property of a liquid or gaseous fuel.

FIG. 2 shows a three-dimensional view from which the introduction of fuel and the introduction of oxidant can be seen in more detail. A plurality of fuel inlets 12, indicated by arrows, are present in one wall of the housing 1. In the wall opposite the wall having the fuel inlets 12, there are many oxidant inlets 13. These could also be referred to as air inlets, since air 2 comprising oxygen as oxidant is blown in. Thus, oxidant, more accurately air 2 comprising oxygen as oxidant, can flow in a plurality of planes.

It can once again be seen that the catalyst support 5 is arranged between the walls having fuel inlets 12 and oxidant inlets 13, i.e. in the housing 1. The nonwoven 4 can also be seen on the wall having the fuel inlets 12.

The flow established in the housing 1 can be seen in FIG. 3. The air 2 flows through the oxidant inlets 13 into the housing 1. Here, merely by way of example, three oxidant inlets 13 in three planes are shown. In these regions, the air 2 flows through the catalyst support 5 to the nonwoven 4 in which the fuel 3 is dispersed and vaporized. Flow channels 14 which assist flow through the catalyst support 5 are arranged in the catalyst support 5 in these regions. On flowing through the catalyst support 5, the air takes up heat liberated in the oxidation. The conduction of heat in the catalyst support 5 enables the heat to be transported to the flow channels and there be transferred to the air 2. The air which has been heated in the flow channels 14 flows to the nonwoven 4. There, vaporization of the fuel 3 occurs. A mixture of air 2 and vaporized fuel 3 flows back to the catalyst support 5 so that oxidation of the fuel 3 can take place there. The oxygen present in the air 2 serves as oxidant. The backward flow occurs, as can be seen, to the regions between the flow channels 14. Flow through the catalyst support 5 to the side opposite the nonwoven 4 also occurs. From there, flow to the flow channels 14 occurs. This results in the circulations indicated by the arrows so that, in the flow channels 14 and their extension, flow occurs from the oxidant inlets 13 through the catalyst support 5 to the nonwoven 4, while backward flow occurs in the other regions.

In addition, a flow 9 occurs in the direction of the conversion zone 10. This results in a flow in the direction of the conversion zone 10, in which the fuel is converted further catalytically and thermally and finally leaves the housing 1 as fuel 11 having altered ignition properties through an outlet (not shown) and is fed to an internal combustion engine.

FIG. 4 shows the structure of a stack 15. A plurality of the above-described arrangements are arranged next to one another in the stack 15. The arrows indicate the flow direction of the converted fuel 11.

The conversions and reactions taking place will now be described in more detail for an example. Diesel and air are used as starting materials. The proportions by weight based on the sum of diesel and air are as follows: alkanes 22.1%, alkenes 0.6%, aromatics 7.9% and nitrogen 51.9%.

During the course of the oxidation processes, a partial oxidation takes place in part and leads to a proportion by weight of 0.2% of hydrogen and 5.7% of carbon monoxide in the exiting fuel 11 having altered ignition properties. Total oxidation contributions lead to a proportion by weight of 6.9% of water and 8.8% of carbon dioxide. The cracking reactions, i.e. conversion reactions, lead to a proportion by weight of 3.1% of alkanes, 12.5% of alkenes and 2.8% of aromatics. The exiting fuel 11 having altered ignition properties thus has a significantly different composition than the air 2 fed in and the fuel 3 fed in. Only the proportion by weight of nitrogen remains the same at 51.9%.

It can be seen from FIG. 5 that when diesel is used as introduced fuel 3, different concentrations of alkanes occur in the fuel 11 having altered ignition properties. Here, the number of carbon atoms of the respective alkane is plotted on the horizontal axis and the mass flow is plotted on the vertical axis. The various shadings indicate the pressure present in the housing 1. The composition of the fuel 11 having an altered ignition property thus depends critically on the pressure at which the reactions take place.

In FIGS. 6 to 8, the number of carbon atoms is likewise plotted on the horizontal axis and the mass flow is plotted on the vertical axis. The different shadings in FIGS. 6 and 7 show the different pressures during the reactions. FIG. 6 shows the distribution of the alkenes and FIG. 7 shows the distribution of the aromatics.

The different shadings in FIG. 8 show the different air numbers, i.e. the different mass ratios of air 2 to fuel 3.

In FIG. 9, the ignition delay time in ms is plotted on the vertical axis and the reciprocal of the ignition temperature in 1/K is plotted on the horizontal axis. The continuous black curve located at right shows the performance of unaltered diesel. The gray curve with squares shows the performance of fuel having altered ignition properties, with the alteration having taken place at a pressure of 0.3 bar. The gray curve with triangles shows the performance when the conversion has been carried out at a pressure of 1.1 bar. The gray curve with diamonds shows the performance of unaltered super gasoline having an octane number of 95. It can thus be seen that the ignition property of diesel can be brought close to the ignition property of super gasoline by the process.

To clarify the use of and to hereby provide notice to the public, the phrases "at least one of <A>, <B>, ... and <N>" or "at least one of <A>, <B>, <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, ... or N including any one element alone or the one element in combination with one or more of the other elements which may also include, in combination, additional elements not listed. Unless otherwise indicated or the context suggests otherwise, as used herein, "a" or "an" means "at least one" or "one or more."

The invention claimed is:

1. A method utilizing a unit comprising a dispersion zone, an oxidation zone, and a conversion zone, the method comprising:
   feeding an oxidant and a fuel into the unit, wherein the unit comprises a housing, and wherein the housing includes a plurality of fuel inlets on one wall of the housing and a plurality of oxidant inlets on an opposing wall of the housing;
   dispersing the fuel in the dispersion zone, the dispersion zone comprising a dispersion structure;
   oxidizing at least part of the fuel in the oxidation zone by means of the oxidant over a catalyst on a catalyst support;
   transferring into the dispersion zone at least part of the heat evolved by the oxidizing of at least part of the fuel;
   vaporizing the fuel in the dispersion zone;
   converting at least part of the dispersed fuel and/or a supplied fuel thermally and/or catalytically in the conversion zone; and
   setting an ignition property of the fuel by means of:
      the molar ratio of oxygen present in the oxidant to the oxygen required for complete oxidation of the fuel present,
      and/or the pressure in the unit,
      and/or the residence time,
      and/or the temperature,
   wherein, upon exiting the unit, the fuel having an altered ignition property has a different composition than the oxidant and the fuel fed into the unit.

2. The method of claim 1, further comprising transferring into the conversion zone, at least part of the heat evolved by the oxidizing the at least part of the fuel.

3. The method of claim 2, wherein the heat is transferred by convection and/or radiation.

4. The method of claim 1, further comprising feeding the oxidant to the dispersion zone and subsequently conveying the oxidant together with the fuel into the oxidation zone and/or the conversion zone.

5. The method of claim 1, wherein the heat required for the vaporization and/or thermal and/or catalytic conversion in the dispersing and the converting is obtained substantially by the oxidizing.

6. The method of claim 1, further comprising mixing oxidant, fuel, and a plurality of intermediates in the oxidation zone, wherein the intermediates are from the oxidizing and/or are reaction products from the converting.

7. The method of claim 1, wherein the oxidant includes air or exhaust gases comprising residual oxygen.

8. The method of claim 1, wherein a pressure in the unit is within a range from 0.05 to 10 bar.

9. The method of claim 1, wherein the fuel includes gasoline, diesel, bio oils, pyrolysis oils, biodiesel, heavy oil, alcohols, Fisher-Tropsch fuels, dimethyl ether, diethyl ether, oxymethylene ethers (OME1-OME10 and mixtures), esters, aldehydes, aromatics, amines, carboxylic acids, alkanes, natural gas, camping gas, LPG, flare gases, landfill gases, bio gases, and/or mixtures thereof.

10. The method of claim 1, wherein the molar ratio of oxygen present in the oxidant to the oxygen required for complete oxidation of the fuel present is from 0.03 to 0.9.

11. The method of claim 1, further comprising setting the ignition property additionally by means of at least one of:
   distances between oxidant inlet, catalyst and dispersion structure,
   position and/or dimension and/or number and/or shape of the oxidant inlet and fuel inlet,
   flow field of the oxidant,
   structure and cell density of the catalyst support,
   the catalyst material and distribution thereof on the catalyst support, or
   arrangement and shape of an outlet of the unit.

12. The method of claim 1, further comprising supplying the converted fuel to a combustion apparatus, an internal combustion engine, a petrol engine, a diesel engine, a gas engine, a turbine, and/or a burner.

13. The method of claim 12, wherein the setting the ignition property is regulated such that, taking into account variable performance requirements which the combustion apparatus has to meet, a pollutant emission and/or an emission of $NO_x$ and particulates is reduced.

14. The method of claim 1, further comprising feeding converted fuel to an exhaust gas treatment apparatus.

15. The method of claim 1, wherein the fuel has a first ignition readiness and the converted fuel has a second ignition readiness lower than the first ignition readiness.

16. The method of claim 1, wherein the dispersion structure comprises a nonwoven.

17. The method of claim 16, wherein a flow velocity of the fuel is reduced in the nonwoven.

18. The method of claim 1, wherein the dispersion structure and the catalyst support are arranged in a stack, the stack comprising a plurality of the dispersion structures and a plurality of the catalyst supports.

19. The method of claim 1, wherein air flows forward through the catalyst support to the dispersion structure,
   wherein air also flows backward through the catalyst support to a side opposite the dispersion structure, and
   wherein a flow direction of the converted fuel is substantially parallel to a plane of the catalyst support.

20. A method utilizing a unit comprising a dispersion zone, an oxidation zone, and a conversion zone, the method comprising:
   feeding an oxidant and a fuel into the unit;
   dispersing the fuel in the dispersion zone, the dispersion zone comprising a dispersion structure;
   oxidizing at least part of the fuel in the oxidation zone by means of the oxidant over a catalyst on a catalyst support;
   transferring into the dispersion zone at least part of the heat evolved by the oxidizing of at least part of the fuel;
   vaporizing the fuel in the dispersion zone;
   converting at least part of the dispersed fuel and/or a supplied fuel thermally and/or catalytically in the conversion zone; and
   setting an ignition property of the fuel by means of:
      the molar ratio of oxygen present in the oxidant to the oxygen required for complete oxidation of the fuel present,
      and/or the pressure in the unit,
      and/or the residence time,
      and/or the temperature,
   wherein air flows forward through the catalyst support to the dispersion structure,
   wherein air also flows backward through the catalyst support to a side opposite the dispersion structure,
   wherein a flow direction of the converted fuel is substantially parallel to a plane of the catalyst support, and
   wherein, upon exiting the unit, the fuel having an altered ignition property has a different composition than the oxidant and the fuel fed into the unit.

* * * * *